May 2, 1967 S. C. WOLNIAK ET AL 3,317,215
ROD SEAL
Filed March 17, 1964
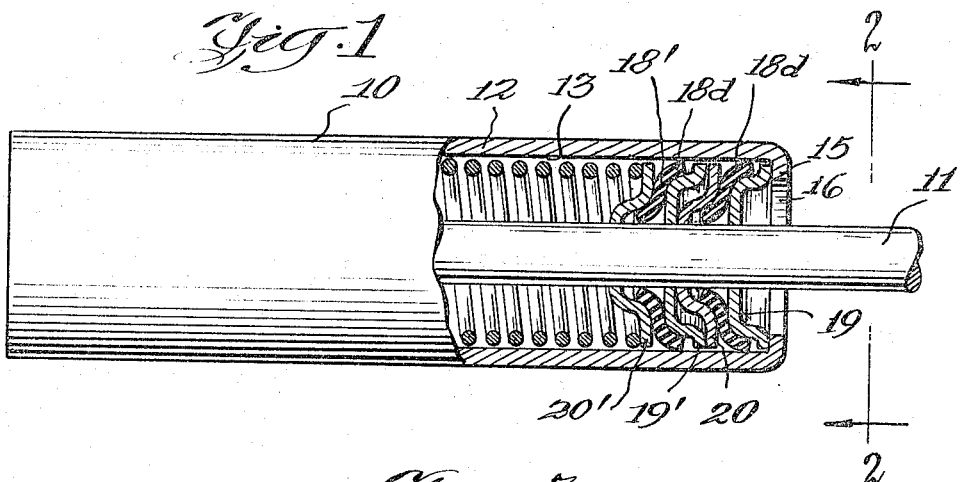
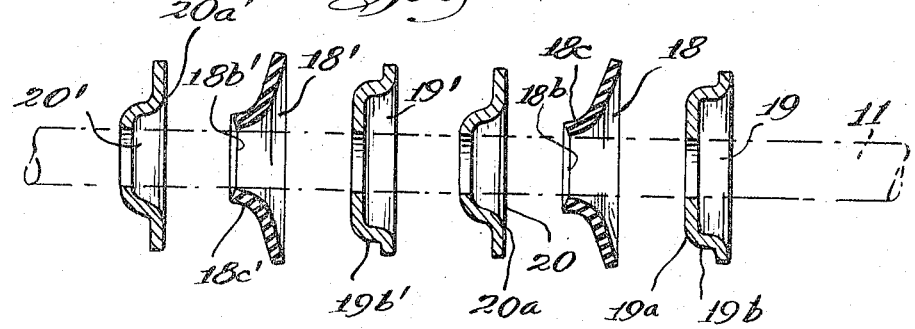
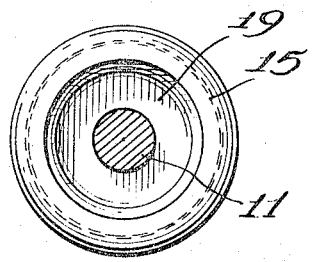 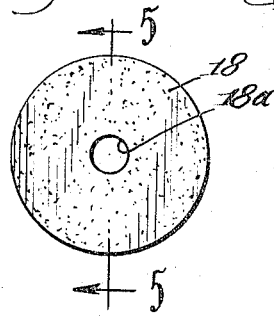 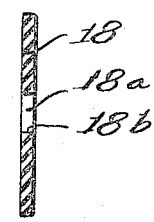
Inventors
Stanley C. Wolniak
Elbert M. Spencer
By Hofgren, Wegner, Allen, Stellman & Coe
attorneys ent Office 3,317,215
Patented May 2, 1967

3,317,215
ROD SEAL
Stanley C. Wolniak, Chicago, and Elbert M. Spencer, Wildwood, Ill., assignors to The Illinois Lock Company, a corporation of Illinois
Filed Mar. 17, 1964, Ser. No. 352,508
3 Claims. (Cl. 277—188)

This invention relates to seals and more particularly to a seal for a reciprocable rod.

A rod seal, as for a piston and cylinder hydraulic door closer, is often a washer of rubber or other resilient material, having a hole through which the rod extends. The washer is held by a pair of substantially planar complementary discs which grip the peripheral portions of the washer, while leaving the central portion free. The washer hole and the rod are substantially the same diameter and the edge of the washer hole engages the rod for the entire thickness of the washer.

It has been found that this seal has several undesirable characteristics, which contribute to leakage. The washer has little ability to compensate for wear as the hole therein is substantially the same diameter as the rod. Thus, after a period of use, the hole is likely to be enlarged allowing fluid to escape. Any pressure developed within the device, as the pressure on hydraulic fluid in a piston and cylinder door closer, for example, tends to force the liquid out between the washer and the rod.

Furthermore, as the rod moves back and forth, the washer has a tendency to rock slightly, the edge of the aperture on the side of the washer toward which the rod is moving, tending to lift slightly. It is believed that this rocking action actually pumps the fluid out of the cylinder. More particularly, as the rod moves inwardly, the inner edge of the washer is lifted from the rod, allowing hydraulic fluid to flow under the washer. When the rod moves outwardly of the cylinder on the next operation, the outer edge lifts and the fluid trapped under the washer is released.

A primary object of this invention is to provide a new and improved piston rod seal for piston and cylinder assemblies.

One feature of the invention is that the seal is provided by a washer of resilient material which has an aperture receiving the piston rod the diameter of the aperture being less than the rod diameter. The washer is deformed upon application to the piston rod and an edge of the aperture contacts the rod, forming the seal.

Further features and advantages of the present invention will be apparent from the following specification and from the drawings, in which:

FIGURE 1 is a section through a seal embodying the invention in a piston and cylinder assembly having a portion of the cylinder wall broken away;

FIGURE 2 is a view taken along line 2—2 of FIGURE 1;

FIGURE 3 is an exploded view illustrating the invention;

FIGURE 4 is an enlarged elevation of the resilient sealing washer in its free undeformed condition; and FIGURE 5 is a section taken along line 5—5 of FIGURE 4.

Referring now more particularly to the drawings, in FIGURE 1 there is shown a piston and cylinder assembly in which the cylinder 10 has a piston rod 11 mounted for reciprocation therein. The cylinder 10 has a wall 12 defining a bore 13. The cylinder has an annular end flange 15 at one end which defines an opening 16 for piston rod 11.

The piston rod 11, shown in the form of an elongate cylindrical rod, is mounted to reciprocate along the longitudinal axis of bore 13. In a hydraulic door closer the cylinder contains a quantity of hydraulic fluid. See, for example, Gray et al. Patent 3,078,499.

The rod seal incorporates one or more resilient seal members or washers, there being two shown herein, and identified as 18 and 18'. The two washers and their supporting rings are identical and only one set will be described in detail. Corresponding parts of the second washer assembly will be indicated by the same reference numeral with a prime mark.

Washer 18 is generally circular in shape and has a round hole or aperture 18a in the center, FIGURE 4. The aperture in the washer is smaller in diameter than the rod 11 and when the washer is placed on the rod, the washer deforms with the center portion of the washer extending longitudinally of the rod. Only the edge surface 18b of the washer is in contact with the rod surface. The center portion 18c of the washer is stretched, so that it holds the edge 18b against the surface of the rod, under tension, providing an extremely tight seal. As the device is used, a certain amount of wear occurs. The center portion 18c of the washer, being under tension, contracts as wear occurs, maintaining a tight seal.

The resilient washers 18, 18' may, for example, be made of "Buna N" synthetic rubber. This rubber is a compound of butadiene and acrylonitrile, and closely resembles natural rubber. Various resilient and flexible materials may, of course, be used.

Each of the washers 18, 18' is provided with a pair of supporting rings which fit closely around the rod 11, guiding its movement, while supporting the washers 18. Backup ring 19 which supports the interior convex surface of washer 18 is cup-shaped and has a shoulder 19a which engages an annular surface of washer 18 around and spaced outwardly from rod 11. Bearing ring 20 has a shoulder 20a which engages the outer or exterior concave surface of the washer along an annular area spaced immediately inside the area supported by the backup ring. The two supporting rings engage the sealing washer outwardly from the deformed or stressed center portion of the washer, and do not disturb the tight seal between edge 18b of the washer and the rod.

The outermost backup ring 19 is seated against cylinder flange 15 and backup ring 19' associated with the left hand sealing member (as viewed in FIGURE 1) is seated against bearing ring 20. A piston return spring 22 is seated on the periphery of bearing ring 20' of the left hand seal assembly and holds the entire seal assembly together. Of course, where a piston spring is not used, other means may be provided for holding the seal elements tightly together. For example, bearing ring 20' could be seated against a fixed stop, and an adjustable threaded plug provided to position backup ring 19.

The stressed portion 18a of the washer is located in a space 23 between the two supporting rings. Being without physical restraint from a rigid member, the sealing portion of the washer is free to move as may be necessary, from wear or the like. Furthermore, the hydraulic fluid within the cylinder 10 enters the space between bearing ring 20' and the washer 18'. The pressure exerted on the hydraulic fluid, as a result of the operation of the closer, forces the seal portion 18a' of the washer more tightly against the rod, enhancing the sealing action.

The sealing washers are larger in diameter than the cylinder, with the outer edges 18d, 18d' being squeezed between the peripheral surfaces 19b, 19b' of the backup rings and the cylinder wall. This prevents escape of fluid around the outside of the seal assembly.

While we have shown and described certain embodiments of our invention, it is to be understood that it is capable of many modifications. Changes, therefore, in the construction and arrangement may be made without departing from the spirit and scope of the invention as disclosed in the appended claims.

We claim:
1. In a piston and cylinder device having a reciprocating piston rod extending from an end of said cylinder, an end seal for said rod, comprising: a resilient washer transversely disposed in said cylinder and having a central aperture receiving said rod, said washer, prior to installation, being flat and having an aperture diameter less than the cross-sectional diameter of said rod, said aperture and the central portion of said washer immediately surrounding said aperture being expanded by the rod flexing the washer, the central portion extending generally longitudinally of the rod defining an exterior concave surface on one side of the washer and an interior convex surface on the opposite side thereof; a back-up ring around said piston rod having a shoulder facing and supporting the inner convex surface of the washer, outwardly of the central expanded portion; a cup-shaped bearing ring around said piston rod having a shoulder engaging the exterior concave surface of the washer inside the shoulder of the back-up ring, the expanded portion of the washer extending into the cup of the bearing ring; and means holding said bearing ring, washer and back-up ring together.

2. The rod seal of claim 1 wherein said cylinder contains a hydraulic fluid which may be subjected to pressure, said back-up ring being seated against the inner surface of an end wall of the cylinder and the deformed portion of the washer extending inwardly of the cylinder therefrom, and the portions of the back-up and bearing rings immediately surrounding said rod and on either side of the deformed portion of the washer being spaced apart a distance greater than the thickness of the washer to permit the hydraulic fluid to exert pressure on the expanded portion of the washer holding it tightly against the rod.

3. The piston and cylinder device of claim 1 wherein said washer has an outer diameter greater than the inner diameter of said cylinder and said back-up ring has an annular peripheral surface inside and parallel with the inner wall of the cylinder, the outer peripheral portion of the washer being held tightly between said parallel surfaces.

References Cited by the Examiner

UNITED STATES PATENTS

| | | | |
|---|---|---|---|
| 1,983,522 | 12/1934 | Coultas | 277—35 |
| 2,920,882 | 1/1960 | Allinquant | 74—18.1 X |
| 2,979,345 | 4/1961 | Potter | 277—168 X |
| 3,057,004 | 10/1962 | Sogoian | 16—52 |
| 3,104,916 | 9/1963 | Dowling et al. | 308—3.5 |

SAMUEL ROTHBERG, *Primary Examiner.*